US011942258B2

(12) United States Patent
Yen et al.

(10) Patent No.: US 11,942,258 B2
(45) Date of Patent: Mar. 26, 2024

(54) INDUCTOR DEVICE

(71) Applicant: Realtek Semiconductor Corporation, Hsinchu (TW)

(72) Inventors: Hsiao-Tsung Yen, Hsinchu (TW); Ting-Yao Huang, Hsinchu (TW); Ka-Un Chan, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 504 days.

(21) Appl. No.: 17/371,250

(22) Filed: Jul. 9, 2021

(65) Prior Publication Data

US 2022/0130591 A1 Apr. 28, 2022

(30) Foreign Application Priority Data

Oct. 26, 2020 (TW) ................................ 109137158

(51) Int. Cl.
*H01F 27/28* (2006.01)
*H01F 17/00* (2006.01)
*H01F 27/29* (2006.01)

(52) U.S. Cl.
CPC ..... *H01F 27/2804* (2013.01); *H01F 17/0013* (2013.01); *H01F 27/2828* (2013.01); *H01F 27/29* (2013.01); *H01F 2017/004* (2013.01); *H01F 2017/0073* (2013.01); *H01F 2027/2809* (2013.01)

(58) Field of Classification Search
CPC ............ H01F 27/2804; H01F 17/0013; H01F 27/2828; H01F 27/29
USPC ........................................ 336/200, 232, 192
See application file for complete search history.

(56) References Cited

U.S. PATENT DOCUMENTS

| | | | | |
|---|---|---|---|---|
| 10,186,364 | B2 | 1/2019 | Yen et al. | |
| 2013/0257577 | A1 * | 10/2013 | Nazarian | H01F 27/34 336/200 |
| 2017/0098500 | A1 * | 4/2017 | Yen | H01F 27/29 |
| 2018/0330872 | A1 * | 11/2018 | Yen | H01F 27/2823 |
| 2019/0148479 | A1 * | 5/2019 | Yen | H01L 23/5227 336/173 |
| 2019/0279809 | A1 * | 9/2019 | Yen | H01F 17/0006 |

FOREIGN PATENT DOCUMENTS

| | | |
|---|---|---|
| TW | I727815 B | 5/2021 |
| TW | I727904 B | 5/2021 |

* cited by examiner

*Primary Examiner* — Bickey Dhakal
*Assistant Examiner* — Kazi S Hossain
(74) *Attorney, Agent, or Firm* — Locke Lord LLP; Tim Tingkang Xia, Esq.

(57) ABSTRACT

An inductor device includes a first and a second inductor and a first and a second connection member. A first and a second trace of the first inductor is located on a first and a second layer respectively. The second trace is coupled to the first trace located at a first and a second area. The first connection member is coupled to the second trace. A third and a fourth trace of the second inductor is located on the first and the second layer respectively. The first trace and the third trace are disposed in turn at the first area and the second area. The fourth trace is coupled to the third trace located at the first and the second area. The second and the fourth trace are disposed in turn at the first and the second area. The second connection member is coupled to the fourth trace.

20 Claims, 5 Drawing Sheets

INDUCTOR DEVICE

RELATED APPLICATIONS

This application claims priority to and the benefit of Taiwan Application Serial Number 109137158, filed on Oct. 26, 2020, the entire contents of which are incorporated herein by reference as if fully set forth below in its entirety and for all applicable purposes.

BACKGROUND

Field of Invention

The present disclosure relates to an electronic device. More particularly, the present disclosure relates to an inductor device.

Description of Related Art

The various types of inductors according to the prior art have their advantages and disadvantages. For example, inductance density of an inductor or a transformer, having crossing structure, is low. In addition, Q value of stack-typed inductor or transformer is low. Therefore, the scopes of application of the above inductors are limited.

SUMMARY

The foregoing presents a simplified summary of the disclosure in order to provide a basic understanding to the reader. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

One aspect of the present disclosure is to provide an inductor device. The inductor device includes a first inductor, a first connection member, a second inductor, and a second connection member. The first inductor includes a first trace and a second trace. The first trace is located on a first layer. The second trace is located on a second layer, and coupled to the first trace in a first area and a second area respectively, wherein the first area and the second area are connected to each other at a junction. The first connection member is disposed at a block at which the first trace and the second trace are not disposed and which is adjacent to the junction, and coupled to the second trace. The second inductor includes a third trace and a fourth trace. The third trace is located on the first layer, wherein the first trace and the third trace are disposed in an interlaced manner in the first area and the second area respectively. The fourth trace is located on the second layer, and coupled to the third trace in the first area and the second area respectively, wherein the second trace and the fourth trace are disposed in an interlaced manner in the first area and the second area respectively. The second connection member is disposed at a block at which the third trace and the fourth trace are not disposed and which is adjacent to the junction, and coupled to the fourth trace.

Therefore, based on the technical content of the present disclosure, the structure of the inductor device can use empty blocks to dispose connection members efficiently so as to simplify connection structure in the inductor device, and it only needs two layers to combine two inductors to become one inductor device. In addition, the quality factor of the inductor device adopting the structural configuration of the present disclosure can be enhanced substantially. It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

According to the usual mode of operation, various features and elements in the figures have not been drawn to scale, which are drawn to the best way to present specific features and elements related to the disclosure. In addition, among the different figures, the same or similar element symbols refer to similar elements/components.

DESCRIPTION OF THE EMBODIMENTS

To make the contents of the present disclosure more thorough and complete, the following illustrative description is given with regard to the implementation aspects and embodiments of the present disclosure, which is not intended to limit the scope of the present disclosure. The features of the embodiments and the steps of the method and their sequences that constitute and implement the embodiments are described. However, other embodiments may be used to achieve the same or equivalent functions and step sequences.

Unless otherwise defined herein, scientific and technical terminologies employed in the present disclosure shall have the meanings that are commonly understood and used by one of ordinary skill in the art. Unless otherwise required by context, it will be understood that singular terms shall include plural forms of the same and plural terms shall include the singular. Specifically, as used herein and in the claims, the singular forms "a" and "an" include the plural reference unless the context clearly indicates otherwise.

Figure 1:
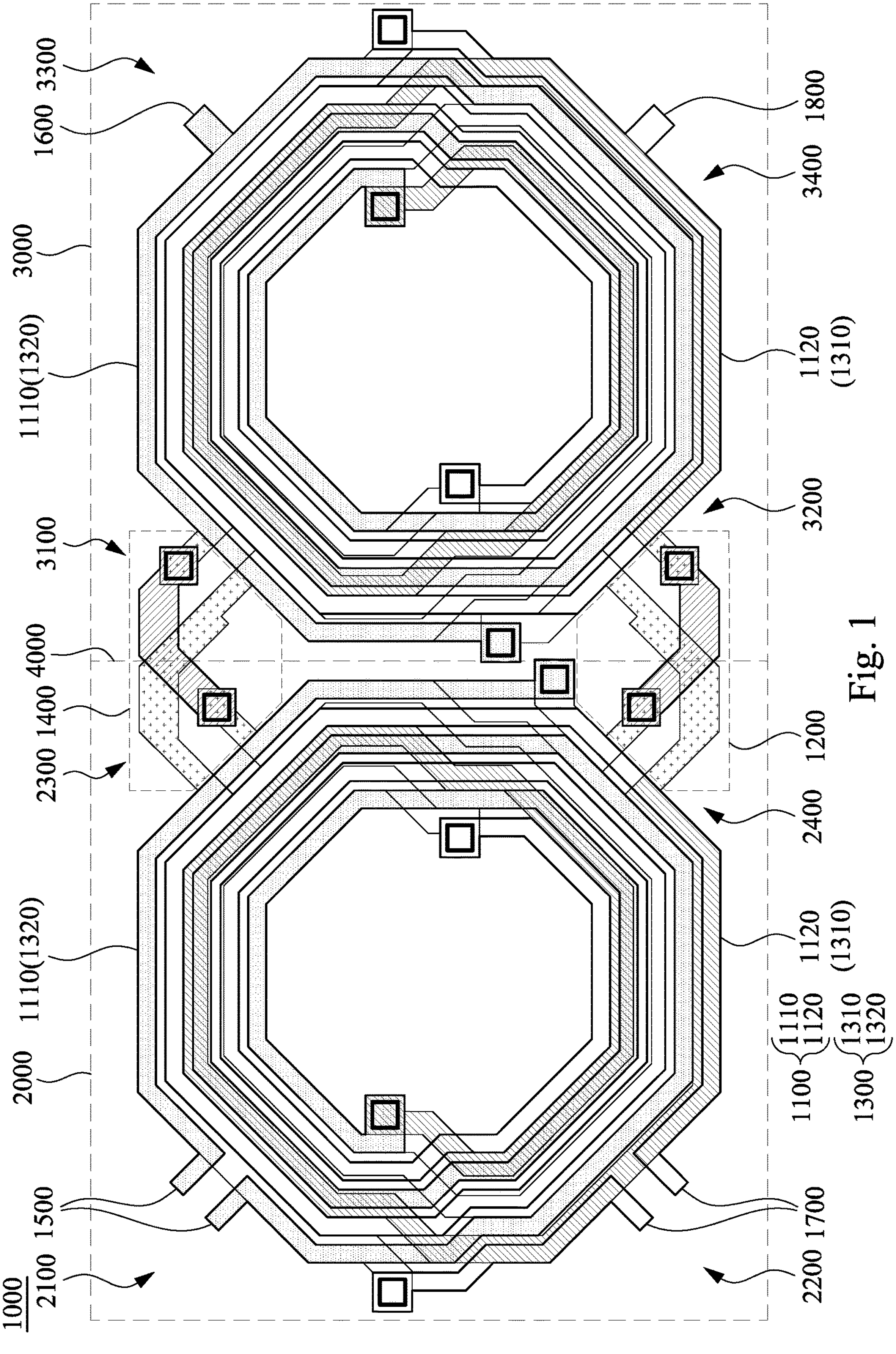
FIG. 1 depicts a schematic diagram of an inductor device according to one embodiment of the present disclosure.

FIG. 1 depicts a schematic diagram of an inductor device 1000 according to one embodiment of the present disclosure. As shown in the figure, the inductor device 1000 includes a first inductor 1100, a first connection member 1200, a second inductor 1300, and a second connection member 1400. The first inductor 1100 includes a first trace 1110 and a second trace 1120. The second inductor 1300 includes a third trace 1310 and a fourth trace 1320.

Figure 2:
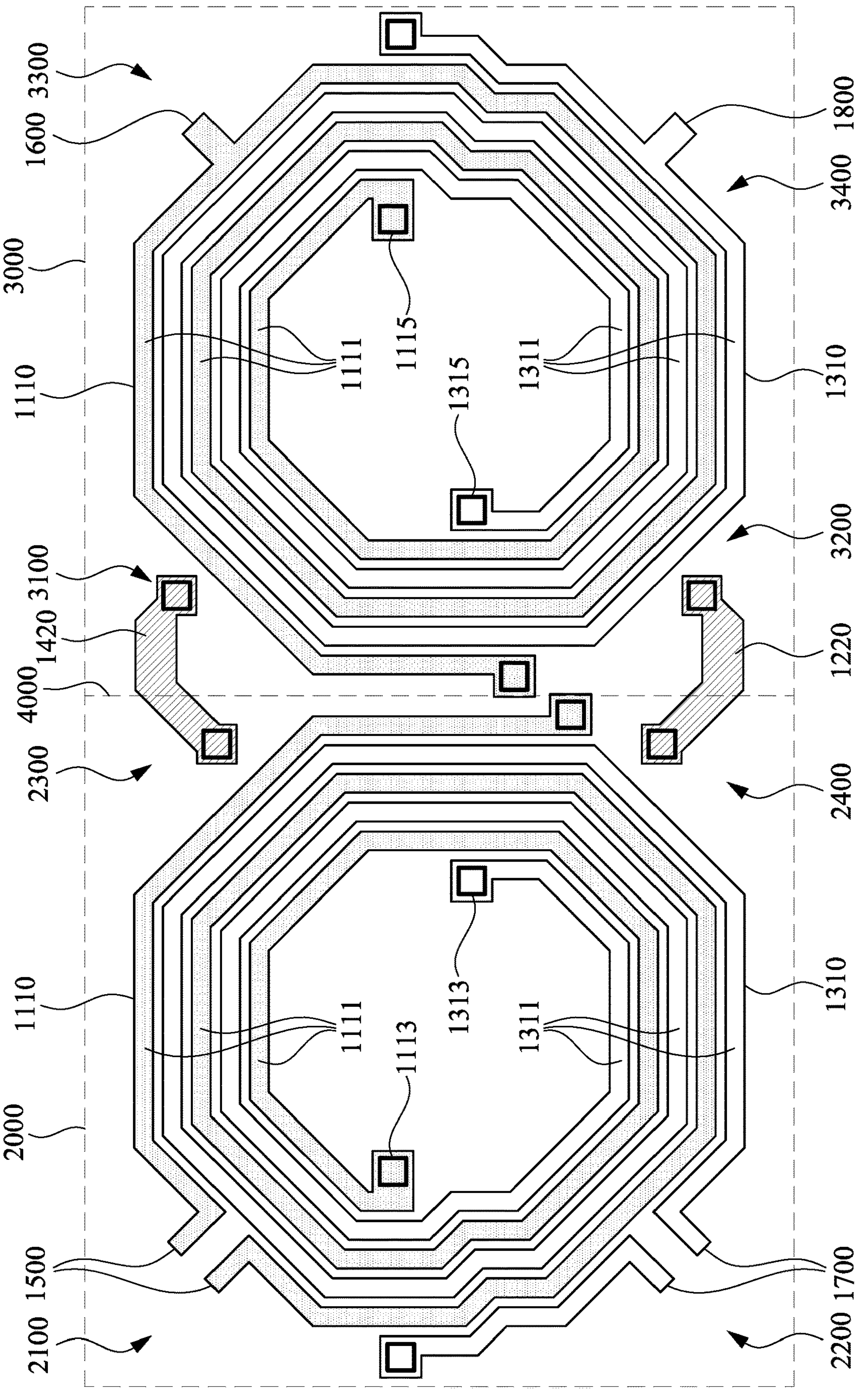
FIG. 2 depicts a schematic diagram of a partial structure of the inductor device shown in FIG. 1 according to one embodiment of the present disclosure.
Figure 3:
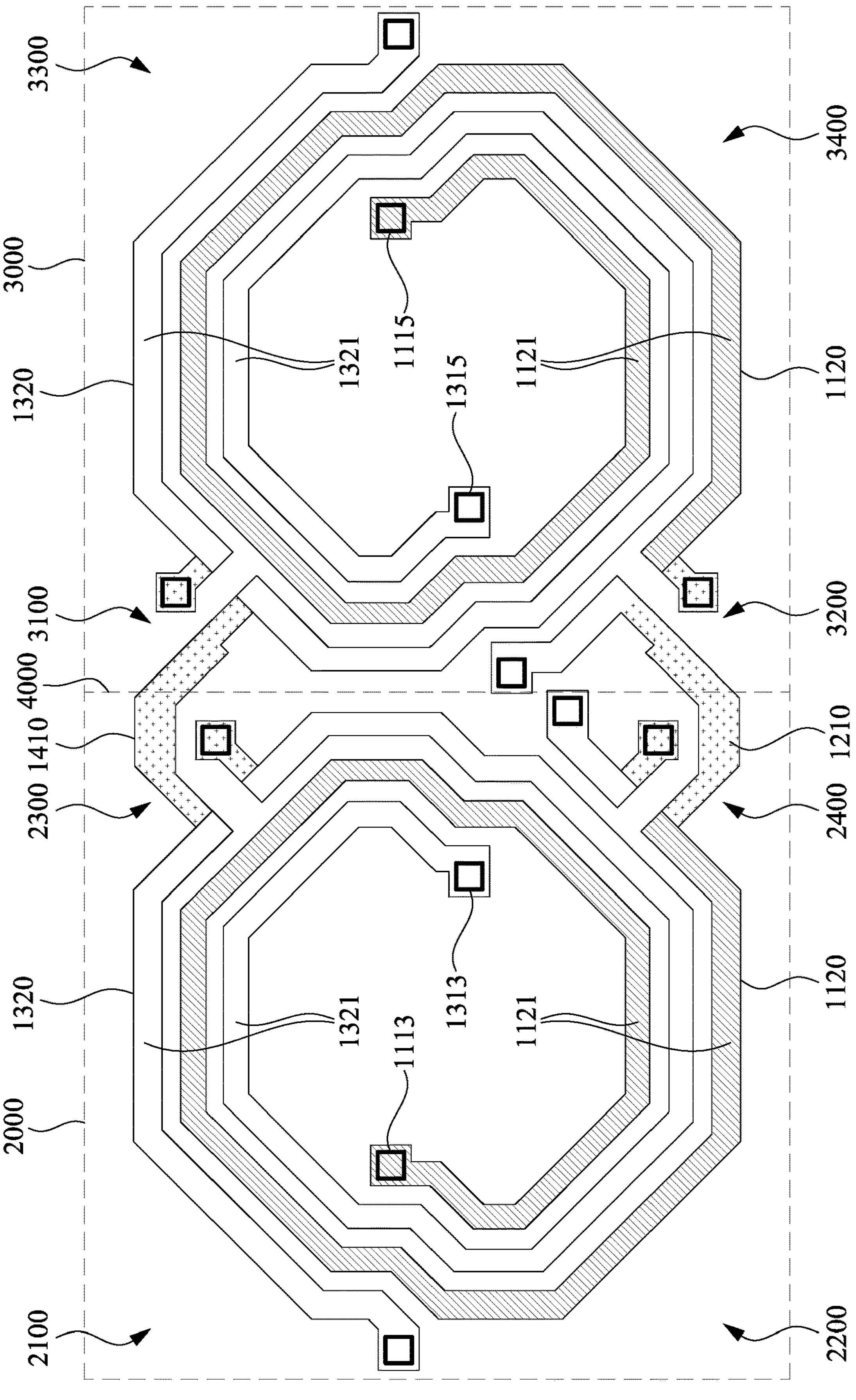
FIG. 3 depicts a schematic diagram of a partial structure of the inductor device shown in FIG. 1 according to one embodiment of the present disclosure.

For facilitating the understanding of the inductor device 1000 shown in FIG. 1, reference is now made to both FIG. 2 and FIG. 3. FIG. 2 and FIG. 3 depict schematic diagrams of partial structures of the inductor device 1000 shown in FIG. 1 according to one embodiment of the present disclosure.

As shown in FIG. 2, the first trace 1110 is located on a first layer. As shown in FIG. 3, the second trace 1120 is located on a second layer, and the second trace 1120 is coupled to the first trace 1110 in FIG. 2 in a first area 2000 and a second area 3000. For example, the first area 2000 is located at the left side of the figure, and the second area 3000 is located at the right side of the figure.

In addition, the first area 2000 and the second area 3000 are connected to each other at a junction 4000. The first connection member 1200 is disposed at a block at which the first trace 1110 and the second trace 1120 are not disposed and which is adjacent to the junction 4000, and coupled to the second trace 1120. For example, the first trace 1110 and the second trace 1120 are all octangle traces. Therefore, an upper left block 2100, a lower left block 2200, an upper right block 2300, and a lower right block 2400 of the first area 2000 do not have any first trace 1110 or any second trace 1120 disposed therein. In other words, the blocks are empty blocks. Similarly, an upper left block 3100, a lower left block 3200, an upper right block 3300, and a lower right block 3400 of the second area 3000 do not have any first trace 1110 or any second trace 1120 disposed therein, and the blocks are empty blocks as well. The empty blocks of the inductor device 1000 of the present disclosure are used to dispose the first connection member 1200 so as to connect the second trace 1120. However, the present disclosure is not limited to the foregoing embodiments in FIG. 2 and FIG. 3, the type of the first trace 1110 and the second trace 1120 can be set to be other type, for example, diamond, depending on actual requirement. Since there are empty blocks around a diamond trace, the first connection member 1200 can be disposed at the empty blocks as well.

Reference is made to FIG. 2, the first trace 1110 and the third trace 1310 are all disposed on the first layer, and the first trace 1110 and the third trace 1310 are disposed to each other in the first area 2000 and the second area 3000 in an interlaced manner. For example, in the first area 2000, the sequence of the first trace 1110 and the third trace 1310 is that: "the first trace 1110, the third trace 1310, the first trace 1110, the third trace 1310, and so on." In addition, the sequence of the first trace 1110 and the third trace 1310 in the second area 3000 is the same as the sequence of the first trace 1110 and the third trace 1310 in the first area 2000.

Reference is made to FIG. 2, the third trace 1310 is located on the first layer. Reference is made to FIG. 3, the fourth trace 1320 is located on the second layer, and the fourth trace 1320 is coupled to the third trace 1310 in FIG. 2 in the first area 2000 and the second area 3000.

Reference is made to FIG. 3, the second trace 1120 and the fourth trace 1320 are all located on the second layer, and the second trace 1120 and the fourth trace 1320 are disposed to each other in the first area 2000 and the second area 3000 in an interlaced manner. For example, in the first area 2000, the sequence of the second trace 1120 and the fourth trace 1320 is that: "the second trace 1120, the fourth trace 1320, the second trace 1120, the fourth trace 1320, and so on." In addition, the sequence of the second trace 1120 and the fourth trace 1320 in the second area 3000 is the same as the sequence of the second trace 1120 and the fourth trace 1320 in the first area 2000.

In addition, the second connection member 1400 is disposed at a block at which the third trace 1310 and the fourth trace 1320 are not disposed and which is adjacent to the junction 4000, and coupled to the fourth trace 1320. For example, the third trace 1310 and the fourth trace 1320 are all octangle traces. Therefore, an upper left block 2100, a lower left block 2200, an upper right block 2300, and a lower right block 2400 of the first area 2000 do not have any third trace 1310 or any fourth trace 1320 disposed therein. In other words, the blocks are empty blocks. Similarly, an upper left block 3100, a lower left block 3200, an upper right block 3300, and a lower right block 3400 of the second area 3000 do not have any third trace 1310 or any fourth trace 1320 disposed therein, and the blocks are empty blocks as well. The empty blocks of the inductor device 1000 of the present disclosure are used to dispose the second connection member 1400 so as to connect the fourth trace 1320. However, the present disclosure is not limited to the foregoing embodiments in FIG. 2 and FIG. 3, the type of the third trace 1310 and the fourth trace 1320 can be set to be other type, for example, diamond, depending on actual requirement. Since there are empty blocks around a diamond trace, the second connection member 1400 can be disposed at the empty blocks as well.

Reference is made to FIG. 2, the first trace 1110 includes a plurality of first wires 1111. Reference is made to FIG. 3, the second trace 1120 includes a plurality of second wires 1121. In the first area 2000, the first wires 1111 in FIG. 2 are coupled to the second wires 1121 in FIG. 3. In the second area 3000, the first wires 1111 in FIG. 2 are coupled to the second wires 1121 in FIG. 3 through second via 1115.

Reference is made to FIG. 2, the inductor device 1000 further includes a first input/output member 1500, and the first input/output member 1500 is disposed in the first area 2000, and coupled to the first wire 1111 which is located at an outermost side among the first wires 1111. In addition, the first input/output member 1500 is located on the first layer.

In some embodiments, the first input/output member 1500 includes a first terminal and a second terminal. The first terminal (e.g., the lower terminal as shown in the figure) of the first input/output member 1500 is coupled to the first wire 1111 which is located at an outermost side among the first wires 1111. The second terminal (e.g., the upper terminal as shown in the figure) of the first input/output member 1500 is disposed at a side which is opposite to the junction 4000, and located at a block at which the first trace 1110 or the third trace 1310 are not disposed. For example, the upper terminal of the first input/output member 1500 is disposed at a left side of the junction 4000 formed by the first area 2000 and the second area 3000, and located at the upper left block 2100 at which the first trace 1110 or the third trace 1310 are not disposed, wherein the upper left block 2100 is located at the upper left corner of the first area 2000.

In one embodiment, the inductor device 1000 further includes a first center-tapped member 1600. The first center-tapped member 1600 is disposed in the second area 3000, and coupled to the first wire 1111 which is located at an outermost side among the first wires 1111. In addition, the first center-tapped member 1600 is located on the first layer.

In some embodiments, the first center-tapped member 1600 includes a first terminal and a second terminal. The first terminal (e.g., the lower terminal as shown in the figure) of the first center-tapped member 1600 is coupled to the first wire 1111 which is located at an outermost side among the first wires 1111. The second terminal (e.g., the upper terminal as shown in the figure) of the first center-tapped member 1600 is disposed at a side which is opposite to the junction 4000, and located on at a block at which the first trace 1110 or the third trace 1310 are not disposed. For example, the upper terminal of the first center-tapped member 1600 is disposed at a right side of the junction 4000 formed by the first area 2000 and the second area 3000, and located at the upper right block 3300 at which the first trace 1110 or the third trace 1310 are not disposed, wherein the upper right block 3300 is located at the upper right corner of the second area 3000.

Reference is now made to FIG. 1, FIG. 2 and FIG. 3, multiple first wires 1111 and multiple second wires 1121 are coupled to each other at a first side (e.g., the left side) and a second side (e.g., the right side) of the inductor device 1000 in an interlaced manner. In another embodiment, in the first area 2000, multiple first wires 1111 and multiple second wires 1121 are coupled to each other at the left side and the right side in an interlaced manner. In addition, in the second area 3000, multiple first wires 1111 and multiple second wires 1121 are coupled to each other at the left side and the right side in an interlaced manner. It is noted that the present disclosure is not intended to be limited to the embodiments in FIG. 1, FIG. 2 and FIG. 3, multiple first wires 1111 and multiple second wires 1121 can also be coupled to each other at a third side (e.g., the upper side) and a fourth side (e.g., the lower side) of the inductor device 1000 in an interlaced manner, depending on actual requirements.

Reference is made to FIG. 2, the third trace 1310 includes a plurality of third wires 1311. Reference is made to FIG. 3, the fourth trace 1320 includes a plurality of fourth wires 1321. In the first area 2000, the third wires 1311 in FIG. 2 are coupled to the fourth wires 1321 in FIG. 3 through a third via 1313. In the second area 3000, the third wires 1311 in FIG. 2 are coupled to the fourth wires 1321 in FIG. 3 through a fourth via 1315.

In one embodiment, the inductor device 1000 further includes a second input/output member 1700, and the second input/output member 1700 is disposed in the first area 2000, and coupled to the third wire 1311 which is located at an outermost side among the third wires 1311. In addition, the second input/output member 1700 is located on the first layer.

In some embodiments, the second input/output member 1700 includes a first terminal and a second terminal. The first terminal (e.g., the upper terminal as shown in the figure) of the second input/output member 1700 is coupled to the third wire 1311 which is located at an outermost side among the third wires 1311. The second terminal (e.g., the lower terminal as shown in the figure) of the second input/output member 1700 is disposed at a side which is opposite to the junction 4000, and located at a block at which the first trace 1111 or the third trace 1310 are not disposed. For example, the lower terminal of the second input/output member 1700 is disposed at a left side of the junction 4000 formed between the first area 2000 and the second area 3000, and located at the lower left block 2200 at which the first trace 1111 or the third trace 1310 are not disposed, wherein the lower left block 2200 is located at the lower left corner of the first area 2000.

In one embodiment, the inductor device 1000 further includes a second center-tapped member 1800. The second center-tapped member 1800 is disposed in the second area 3000, and coupled to the third wires 1311 which is located at an outermost side among the third wires 1311. In addition, the second center-tapped member 1800 is located on the first layer.

In some embodiments, the second center-tapped member 1800 includes a first terminal and a second terminal. The first terminal (e.g., the upper terminal as shown in the figure) of the second center-tapped member 1800 is coupled to the third wires 1311 which is located at an outermost side among the third wires 1311. The second terminal (e.g., the lower terminal as shown in the figure) of the second center-tapped member 1800 is disposed at a side which is opposite to the junction 4000, and located at a block at which the first trace 1111 or the third trace 1310 are not disposed. For example, the lower terminal of the second center-tapped member 1800 is disposed at a right side of the junction 4000 formed between the first area 2000 and the second area 3000, and located at the lower right block 3400 at which the first trace 1111 or the third trace 1310 are not disposed, wherein the lower right block 3400 is located at the lower right corner of the second area 3000.

Reference is now made to FIG. 1, FIG. 2 and FIG. 3, multiple third wires 1311 and multiple fourth wires 1312 are coupled to each other at a first side (e.g., the left side) and a second side (e.g., the right side) of the inductor device 1000 in an interlaced manner. In another embodiment, in the first area 2000, multiple third wires 1311 and multiple fourth wires 1312 are coupled to each other at the left side and the right side in an interlaced manner. In addition, in the second area 3000, multiple third wires 1311 and multiple fourth wires 1312 are coupled to each other at the left side and the right side in an interlaced manner. It is noted that the present disclosure is not intended to be limited to the embodiments in FIG. 1, FIG. 2 and FIG. 3, multiple third wires 1311 and multiple fourth wires 1312 can also be coupled to each other at a third side (e.g., the upper side) and a fourth side (e.g., the lower side) of the inductor device 1000 in an interlaced manner, depending on actual requirements.

Reference is now made to FIG. 1, FIG. 2 and FIG. 3, the first connection member 1200 is located on the first layer and the second layer at the same time, and the first layer is different from the second layer. For example, as shown in FIG. 3, the first connection member 1200 includes a first sub-connection member 1210 which is located on the second layer, and the first sub-connection member 1210 couples the second trace 1120 located in the first area 2000 and the second trace 1120 located in the second area 3000. In addition, as shown in FIG. 2, the first connection member 1200 further includes a second sub-connection member 1220 which is located on the first layer. The second sub-connection member 1220 is coupled to the first sub-connection member 1210 in FIG. 3 through vias (e.g., the square structure shown in the figure), and couples the second trace 1120 located in the first area 2000 and the second trace 1120 located in the second area 3000 through the first sub-connection member 1210.

Reference is now made to FIG. 1, FIG. 2 and FIG. 3, the second connection member 1400 is located on the first layer and the second layer at the same time. For example, as shown in FIG. 3, the second connection member 1400 includes a third sub-connection member 1410 located on the second layer, and the third sub-connection member 1410 couples the fourth trace 1321 located in the first area 2000 and the fourth trace 1321 located in the second area 3000. In addition, reference is made to FIG. 2, the second connection member 1400 further includes a fourth sub-connection member 1420 which is located on the first layer. The fourth sub-connection member 1420 is coupled to the third sub-connection member 1410 in FIG. 3 through vias (e.g., the square structure shown in the figure), and couples the fourth trace 1321 located in the first area 2000 and the fourth trace 1321 located in the second area 3000 through the third sub-connection member 1410.

In one embodiment, the elements shown in FIG. 2 are all located on the first layer, and the elements shown in FIG. 3 are all located on the second layer. The first layer and the second layer are different layers. It is noted that the present disclosure is not limited to the structure as shown in FIG. 1 to FIG. 3, and it is merely an example for illustrating one of the implements of the present disclosure.

Figure 4:
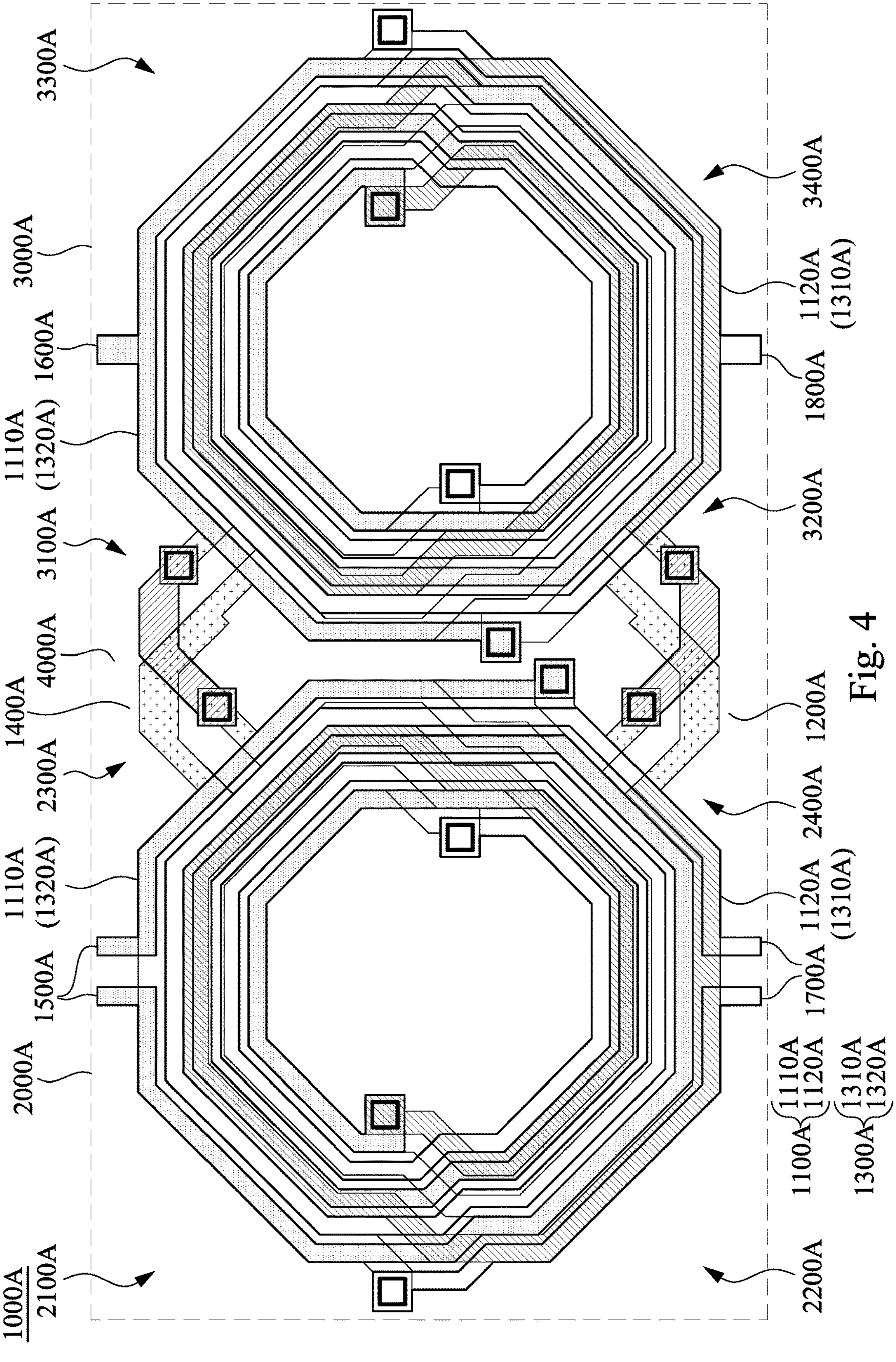
FIG. 4 depicts a schematic diagram of an inductor device according to one embodiment of the present disclosure.

FIG. 4 depicts a schematic diagram of an inductor device 1000A according to one embodiment of the present disclosure. Compared to the inductor device 1000 shown in FIG. 1 to FIG. 3, the first input/output member 1500A, the first center-tapped member 1600A, the second input/output member 1700A and the second center-tapped member 1800A of the inductor device 1000A in FIG. 4 are disposed at a third side (e.g., the upper side) and a fourth side (e.g., the lower side) of the inductor device 1000A. It is noted that the element in FIG. 4, whose symbol is similar to the symbol of the element in FIG. 1 to FIG. 3, has similar structure feature in connection with the element in FIG. 1 to FIG. 3. Therefore, a detail description regarding the structure feature of the element in FIG. 4 is omitted herein for the sake of brevity. In addition, the present disclosure is not limited to the structure as shown in FIG. 4, and it is merely an example for illustrating one of the implements of the present disclosure.

Figure 5:
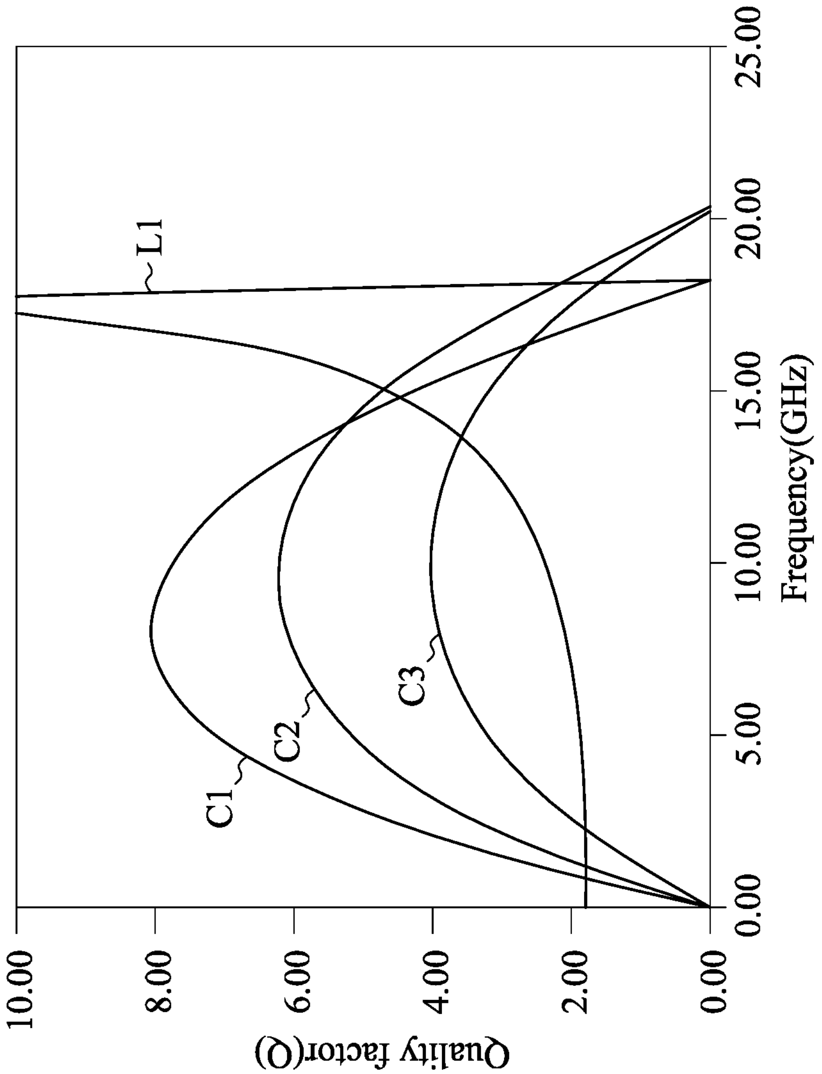
FIG. 5 depicts a schematic diagram of experimental data of an inductor device according to one embodiment of the present disclosure.

FIG. 5 depicts a schematic diagram of experimental data of an inductor device 1000 according to one embodiment of the present disclosure. As shown in the figure, the experimental curve of the quality factor of the inductor device 1000 adopting the structural configuration of the present disclosure is C1, and the experimental curve of the inductance value of the inductor device 1000 is L1. In addition, the experimental curves of the quality factor of the inductor device which does not adopt the structural configuration of the present disclosure are C2, C3. As can be seen from the figure, the inductor device 1000 adopting the structure of the present disclosure has better quality factor. For example, at a frequency of about 5 GHz, the quality factor of the inductor device 1000 is about 7.1, which is 40% higher than the quality factor of the inductor device which does not adopt the structural configuration of the present disclosure. In one embodiment, the size of the inductor device 1000 of the present disclosure is 130 μm×64 μm, the width of the inductor device 1000 is 2 μm, and the spacing of the inductor device 1000 is 1 μm. However, the present disclosure is not limited to the structure as shown in FIG. 5, and it is merely an example for illustrating one of the implements of the present disclosure.

It can be understood from the embodiments of the present disclosure that application of the present disclosure has the following advantages. The structure of the inductor device can use empty blocks to dispose connection members efficiently so as to simplify connection structure in the inductor device, and it only needs two layers to combine two inductors to become one inductor device. In addition, the quality factor of the inductor device adopting the structural configuration of the present disclosure can be enhanced substantially.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An inductor device, comprising:
- a first inductor, comprising:
  - a first trace, located on a first layer; and
  - a second trace, located on a second layer, and coupled to the first trace in a first area and a second area respectively, wherein the first area and the second area are connected to each other at a junction;
- a first connection member, disposed at a block at which the first trace and the second trace are not disposed and which is adjacent to the junction, and coupled to the second trace;
- a second inductor, comprising:
  - a third trace, located on the first layer, wherein the first trace and the third trace are disposed in an interlaced manner in the first area and the second area respectively; and
  - a fourth trace, located on the second layer, and coupled to the third trace in the first area and the second area respectively, wherein the second trace and the fourth trace are disposed in an interlaced manner in the first area and the second area respectively; and
- a second connection member, disposed at a block at which the third trace and the fourth trace are not disposed and which is adjacent to the junction, and coupled to the fourth trace.

2. The inductor device of claim 1, wherein the first trace comprises a plurality of first wires, and the second trace comprises a plurality of second wires.

3. The inductor device of claim 2, wherein in the first area, the first wires are coupled to the second wires through a first via, wherein in the second area, the first wires are coupled the second wires through a second via.

4. The inductor device of claim 3, further comprising:
- a first input/output member, disposed in the first area, and coupled to the first wire which is located at an outermost side among the first wires, wherein the first input/output member is located on the first layer.

5. The inductor device of claim 4, wherein the first input/output member comprises:
- a first terminal, coupled to the first wire which is located at an outermost side among the first wires; and
- a second terminal, disposed at a side which is opposite to the junction, and located at a block at which the first trace is not disposed.

6. The inductor device of claim 5, further comprising:
- a first center-tapped member, disposed in the second area, and coupled to the first wire which is located at an outermost side among the first wires, wherein the first center-tapped member is located on the first layer.

7. The inductor device of claim 6, wherein the first center-tapped member comprises:
- a first terminal, coupled to the first wire which is located at an outermost side among the first wires; and
- a second terminal, disposed at a side which is opposite to the junction, and located at a block at which the first trace is not disposed.

8. The inductor device of claim 7, wherein the first wires and the second wires are coupled to each other at a first side and a second side of the inductor device in an interlaced manner.

9. The inductor device of claim 8, wherein the third trace comprise a plurality of third wires, and the fourth trace comprises a plurality of fourth wires.

10. The inductor device of claim 9, wherein in the first area, the third wires are coupled the fourth wires through a third via, wherein in the second area, the third wires are coupled the fourth wires through a fourth via.

11. The inductor device of claim 10, wherein the first wires and the third wires are disposed to each other in the first area in an interlaced manner, and the first wires and the third wires are disposed to each other in the second area in an interlaced manner, wherein the second wires and the fourth wires are disposed to each other in the first area in an interlaced manner, and the second wires and the fourth wires are disposed to each other in the second area in an interlaced manner.

12. The inductor device of claim 11, further comprising:
a second input/output member, disposed in the first area, and coupled to the third wire which is located at an outermost side among the third wires, wherein the second input/output member is located on the first layer.

13. The inductor device of claim 12, wherein the second input/output member comprises:
a first terminal, coupled to the third wire which is located at an outermost side among the third wires; and
a second terminal, disposed at a side which is opposite to the junction, and located at a block at which the third trace is not disposed.

14. The inductor device of claim 13, further comprising:
a second center-tapped member, disposed in the second area, and coupled to the third wire which is located at an outermost side among the third wires, wherein the second center-tapped member is located on the first layer.

15. The inductor device of claim 14, wherein the second center-tapped member comprises:
a first terminal, coupled to the third wire which is located at an outermost side among the third wires; and
a second terminal, disposed at a side which is opposite to the junction, and located at a block at which the third trace is not disposed.

16. The inductor device of claim 15, wherein the third wires and the fourth wires are coupled to each other at the first side and the second side of the inductor device in an interlaced manner.

17. The inductor device of claim 1, wherein the first connection member is located on the first layer and the second layer, wherein the first layer is different from the second layer.

18. The inductor device of claim 17, wherein the first connection member comprises:
a first sub-connection member, located on the second layer, and coupled to the second trace located in the first area and the second trace located in the second area; and
a second sub-connection member, located on the first layer, and coupled to the second trace located in the first area and the second trace located in the second area through the first sub-connection member.

19. The inductor device of claim 18, wherein the second connection member is located on the first layer and the second layer.

20. The inductor device of claim 19, wherein the second connection member comprises:
a third sub-connection member, located on the second layer, and coupled to the fourth trace located in the first area and the fourth trace located in the second area; and
a fourth sub-connection member, located on the first layer, and coupled to the fourth trace located in the first area and the fourth trace located in the second area through the third sub-connection member.

* * * * *